US010422563B2

(12) United States Patent
Hwang et al.

(10) Patent No.: US 10,422,563 B2
(45) Date of Patent: Sep. 24, 2019

(54) REFRIGERATOR AND CONTROL METHOD THEREOF

(71) Applicant: LG ELECTRONICS INC., Seoul (KR)

(72) Inventors: Gwinan Hwang, Seoul (KR); Junhyo Koo, Seoul (KR); Sanghyun Song, Seoul (KR); Inguk Lee, Seoul (KR); Taehwan Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/971,606

(22) Filed: May 4, 2018

(65) Prior Publication Data

US 2018/0252452 A1  Sep. 6, 2018

Related U.S. Application Data

(63) Continuation of application No. 14/857,455, filed on Sep. 17, 2015, now Pat. No. 9,989,287.

(30) Foreign Application Priority Data

May 11, 2015  (KR) .......................... 10-2015-0065444

(51) Int. Cl.
*F25B 9/02* (2006.01)
*F25D 29/00* (2006.01)
(Continued)

(52) U.S. Cl.
CPC .......... *F25B 49/022* (2013.01); *F25B 31/026* (2013.01); *F25B 49/025* (2013.01);
(Continued)

(58) Field of Classification Search
CPC ...... F25D 29/00; F25B 49/022; F25B 31/026; F25B 49/025
(Continued)

(56) References Cited

U.S. PATENT DOCUMENTS 4,958,269 A * 9/1990 Gritter ................ H02P 23/0077
318/801
5,410,230 A * 4/1995 Bessler ................... H02P 6/085
318/471

(Continued)

FOREIGN PATENT DOCUMENTS

| CN | 1475762 | 2/2004 |
| CN | 1888663 | 1/2007 |

(Continued)

OTHER PUBLICATIONS

International Search Report dated Jan. 26, 2016 issued in Application No. PCT/KR2015/009570.
(Continued)

*Primary Examiner* — Henry T Crenshaw
(74) *Attorney, Agent, or Firm* — Ked & Associates, LLP

(57) ABSTRACT

A control method includes initially operating a compressor at the same RPM as an operating RPM of the compressor during a previous cycle, adjusting the RPM in consideration of an operation rate of the previous cycle such that the RPM is increased when the operation rate is greater than a first set value, reduced when the operation rate is less than a second set value, and maintained when the operation rate is within a range between the first set value and the second set value, and operating the compressor at the adjusted RPM, the first set value being greater than the second set value.

16 Claims, 5 Drawing Sheets

(51) Int. Cl.
  *F25B 31/02* (2006.01)
  *F25D 11/00* (2006.01)
  *F25B 49/02* (2006.01)
(52) U.S. Cl.
  CPC .............. *F25D 11/00* (2013.01); *F25D 29/00* (2013.01); *F25B 2500/19* (2013.01); *F25B 2600/01* (2013.01); *F25B 2600/0251* (2013.01); *F25B 2600/0253* (2013.01); *F25B 2700/2104* (2013.01); *F25D 2700/12* (2013.01); *Y02B 30/741* (2013.01)
(58) Field of Classification Search
  USPC ........................................................ 62/228.1
  See application file for complete search history.

(56) References Cited

U.S. PATENT DOCUMENTS

| | | | | |
|---|---|---|---|---|
| 5,925,999 | A * | 7/1999 | Lakerdas | H02P 7/08 318/495 |
| 6,134,901 | A | 10/2000 | Harvest et al. | |
| 8,011,199 | B1 * | 9/2011 | Chen | F25B 49/022 62/228.5 |
| 8,312,731 | B2 * | 11/2012 | Tomioka | F25B 13/00 62/470 |
| 9,506,666 | B2 * | 11/2016 | Rite | F24F 11/30 |
| 2003/0089121 | A1 * | 5/2003 | Wilson | B01D 53/265 62/228.3 |
| 2003/0145617 | A1 | 8/2003 | Jung | |
| 2004/0206102 | A1 * | 10/2004 | Homan | B60H 1/322 62/228.1 |
| 2004/0237551 | A1 * | 12/2004 | Schwarz | F25B 49/025 62/229 |
| 2005/0091998 | A1 * | 5/2005 | Cho | F25B 49/022 62/175 |
| 2006/0225445 | A1 * | 10/2006 | Lifson | F24F 3/153 62/175 |
| 2007/0012055 | A1 * | 1/2007 | Schenk | F25B 49/025 62/208 |
| 2007/0157645 | A1 * | 7/2007 | Anell | F25D 17/065 62/187 |
| 2007/0199338 | A1 * | 8/2007 | Evans | B60H 1/3213 62/228.4 |
| 2007/0227168 | A1 * | 10/2007 | Simmons | F24F 1/027 62/229 |
| 2008/0041081 | A1 | 2/2008 | Tolbert | |
| 2008/0196445 | A1 * | 8/2008 | Lifson | F25B 49/025 62/498 |
| 2008/0286118 | A1 * | 11/2008 | Gu | F04C 18/0215 417/1 |
| 2008/0307811 | A1 * | 12/2008 | Bryan | B60H 1/3211 62/228.3 |
| 2009/0095002 | A1 * | 4/2009 | McSweeney | F25B 49/022 62/216 |
| 2010/0064703 | A1 * | 3/2010 | Senf, Jr. | F25B 49/025 62/115 |
| 2010/0070091 | A1 | 3/2010 | Watson et al. | |
| 2011/0072836 | A1 * | 3/2011 | Wang | F25B 7/00 62/79 |
| 2014/0165632 | A1 * | 6/2014 | Abbasi | F25D 29/00 62/89 |
| 2018/0252452 | A1 * | 9/2018 | Hwang | F25B 49/025 |

FOREIGN PATENT DOCUMENTS

| | | |
|---|---|---|
| DE | 60027160 | 3/2007 |
| EP | 2 508 818 | 10/2012 |
| JP | 10-009687 | 1/1998 |

OTHER PUBLICATIONS

European Search Report dated Sep. 26, 2016 issued in European Application No. 15190804.3.
U.S. Office Action dated Sep. 19, 2017 issued in co-pending U.S. Appl. No. 14/857,455.
U.S. Notice of Allowance dated Jan. 17, 2018 issued in co-pending U.S. Appl. No. 14/857,455.

* cited by examiner

REFRIGERATOR AND CONTROL METHOD THEREOF

CROSS-REFERENCE TO RELATED APPLICATIONS

This application is a Continuation Application of prior U.S. patent application Ser. No. 14/857,455, filed Sep. 17, 2015, which claims priority under 35 U.S.C. § 119 to Korean Patent Application No. 10-2015-0065444, filed on May 11, 2015, whose entire disclosures are hereby incorporated by reference.

BACKGROUND

1. Field

The present disclosure relates to a refrigerator and a control method thereof and, more particularly, to a refrigerator which enables simplified adjustment in the internal temperature of the refrigerator and a control method thereof.

2. Background

Generally, a refrigerator is an apparatus which is capable of keeping food fresh during a given duration by cooling a storage compartment (a freezing compartment or a refrigerating compartment) via repetition of a refrigeration cycle. Such a refrigerator includes a compressor which compresses a refrigerant circulating through a refrigeration cycle so that the refrigerant has a higher temperature and a higher pressure. The refrigerant compressed in the compressor generates cold air while passing through a heat exchanger and the generated cold air is supplied to the freezing compartment or the refrigerating compartment.

The compressor used in the refrigerator may be repeatedly turned on and off based on the temperature inside the refrigerator. When the temperature inside the refrigerator is a predetermined value or higher, the compressor is turned on to drive the refrigeration cycle. In contrast, when the temperature inside the refrigerator falls down to a preset temperature or less, the supply of cold air is not required and, therefore, the compressor may be turned off.

To control the on/off operation of the compressor, the refrigerator needs to have installed a main PCB that is capable of receiving information regarding, for example, the temperature inside the refrigerator and transmitting an associated command to a compressor controller. The installation of the main PCB, however, causes increased costs.

BRIEF DESCRIPTION OF THE DRAWINGS

Embodiments will be described in detail with reference to the following drawings in which like reference numerals refer to like elements, and wherein.

DETAILED DESCRIPTION

Figure 1:
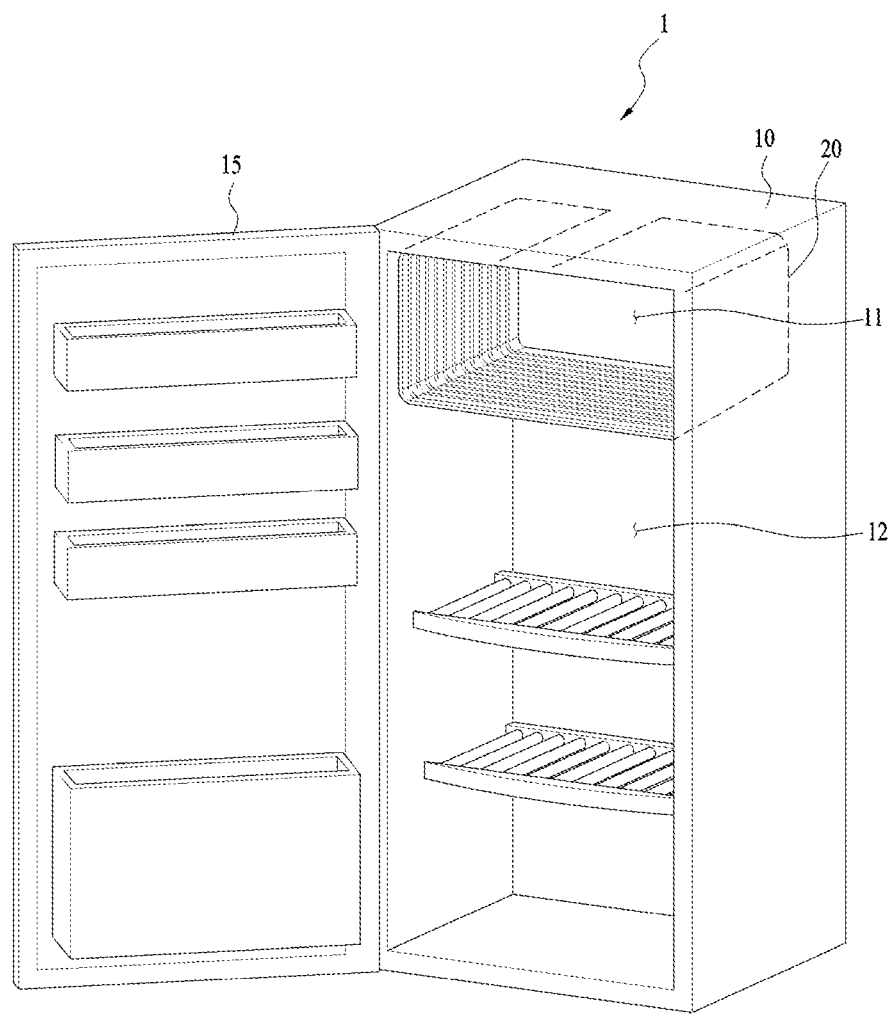
FIG. 1 is a view illustrating a refrigerator to which the present disclosure may be applied.

FIG. 1 is a perspective view illustrating a refrigerator 1 to which the present disclosure may be applied. The refrigerator 1 includes a refrigerator main body 10, an evaporator 20, and a door 15. The present disclosure may be sufficiently applied to a simple shape of a refrigerator in which a freezing compartment and a refrigerating compartment are not divided by respective doors as illustrated in FIG. 1. The present disclosure discloses technology to control a refrigerator using only a compressor microcomputer without having a microcomputer used to control the entire refrigerator.

The refrigerator 1 has a storage compartment defined in the interior thereof and is capable of storing perishable food by maintaining the storage compartment at a constant temperature using a refrigeration cycle. The refrigerator 1 includes the refrigerator main body 10, one side of which is open, the refrigerator main body 10 internally defining the storage compartment, and a door 15 to open or close the open side of the refrigerator main body 10.

The refrigerator main body 10 has defined in the interior thereof the storage compartment for food storage, the front side of which is open. Although the refrigerator main body 10 may wholly define a single space and be maintained at an even temperature, the refrigerator 1 of the type that is commonly used in homes may be divided into a freezing compartment 11, the interior temperature of which is maintained at less than 0° C., and a refrigerating compartment, the interior temperature of which is maintained at a temperature that is higher than 0° C. and lower than a room temperature (for example, the interior temperature of the refrigerating compartment being approximately 10° C.).

There may be provided a single door 15 as illustrated in FIG. 1, or may be provided two or more doors as needed. The number of doors 15 gradually increases as the size of the refrigerator 1 increases and the number of functions of the refrigerator 1 increases. The door 15 may be configured as a hinged door to be opened or closed by rotating about a hinge, or may be configured to be retractable from the refrigerator main body 10 when the refrigerator includes a retractable drawer type storage compartment. The door 15 may be provided in various numbers corresponding to the number of spaces defined within the refrigerator main body 10.

The evaporator 20 is a part of the refrigeration cycle and is installed in the storage compartment to supply cold air to the storage compartment. The refrigeration cycle further includes, for example, a condenser and a compressor, in addition to the evaporator 20. The refrigerant performs heat exchange while circulating through the evaporator 20, the condenser and the compressor, thereby maintaining the storage compartment at a constant interior temperature.

The refrigerator, having liquefied in the condenser and the compressor, absorbs surrounding heat while being vaporized in the evaporator 20, thereby reducing the temperature of the storage compartment. The evaporator 20 is a part that implements heat exchange with the interior of the storage compartment and is formed with convex and concave portions in order to enhance the heat exchange efficiency thereof. The evaporator illustrated in FIG. 1 has a corrugated surface in order to increase the surface area thereof.

Figure 2:
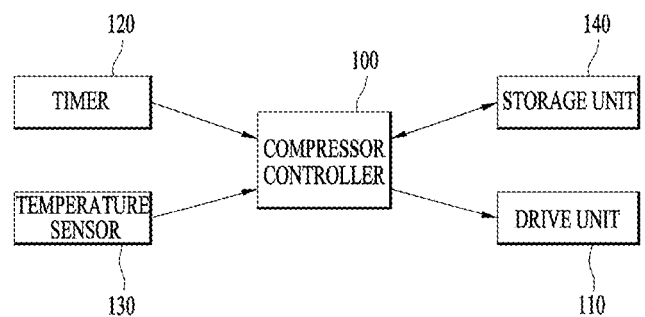
FIG. 2 is a control block diagram according to one embodiment of the present disclosure.

FIG. 2 is a control block diagram according to one embodiment of the present disclosure. The compressor may include a compressor controller 100 and a drive unit or module 110 to be driven by the compressor controller 100. The drive unit 110 may compress lubricant or refrigerant included in the refrigeration cycle while being rotated at a set RPM in response to a driving command of the compressor controller 100. When the drive unit 110 is driven, the interior of the compressor may be lubricated and the refrigerant may be compressed, causing the generation of cooling force.

The compressor controller 100 determines an RPM to enable driving of the drive unit 110, i.e. the compressor and drives the drive unit 110, e.g., the compressor at the corresponding RPM. When the compressor controller 100 drives the compressor at a relatively high RPM, relative large cooling force may be generated. On the other hand, when the compressor controller 100 drives the compressor at a relatively low RPM, relative small cooling force may be generated.

The rotation RPM of the drive unit 110, e.g., the compressor, which is set to drive the drive unit 110 by the compressor controller 100, may be stored in a storage unit or module 140. At this time, the RPM stored in the storage unit 140 may be the RPM of the drive unit 110, e.g., the compressor during a previous cycle. The storage unit 140 may store the RPMs of a plurality of previous cycles.

The compressor may further include a timer 120 to measure the driven time of the drive unit 110, e.g., the compressor. The timer 120 may measure a time taken from a point in time when the compressor starts to be operated to a point in time when the compressor resumes operation, e.g., a time taken for one cycle. In addition, the timer 120 may measure a driving time of the drive unit 110 during one cycle so as to utilize the measured driving time to calculate of the operation rate of the compressor.

The compressor may further include a temperature sensor 130 to measure the temperature of the storage compartment. When the temperature measured by the temperature sensor 130 reaches a set temperature, the compressor controller 100 may stop the drive unit 110. On the other hand, when the temperature measured by the temperature sensor 130 does not reach the set temperature or deviates from the set temperature, the compressor controller 100 may drive the drive unit 110.

For example, when the temperature sensor 130 is a thermostat, the thermostat may open or close a circuit that supplies current to the drive unit 110. The thermostat may be a closed state so long as the temperature of the storage compartment does not fall down to the set temperature. The drive unit 110 may be driven because current can be supplied to the drive unit 110 while the thermostat has been closed. On the other hand, the thermostat may be changed to an opened state when the temperature of the storage compartment falls down to the set temperature. The driving of the drive unit 110 may stop because current can not be supplied to the drive unit 110 once the thermostat has been opened.

Figure 3:
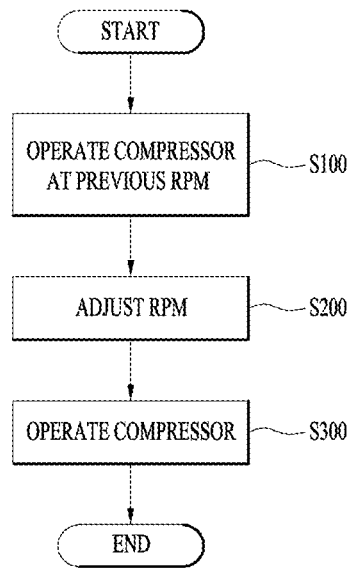
FIG. 3 is a control flowchart according to one embodiment of the present disclosure.

FIG. 3 is a control flowchart according to one embodiment of the present disclosure. When the temperature sensor 130 senses that the temperature of the storage compartment exceeds the set temperature, the compressor, e.g., the drive unit 110, is driven (S100). At this time, the compressor may be operated at the same RPM as the operating RPM of the compressor during a previous cycle that is stored in the storage unit 140.

The RPM may be adjusted when a specific condition is satisfied (S200). For example, the operating RPM of the compressor may be increased or reduced as compared to, or may be maintained equal to the previous RPM. Then, the drive unit 110 is driven at the adjusted RPM (S300).

At this time, the drive unit 110 is continuously driven at the adjusted RPM until the temperature of the storage compartment falls down to the set temperature. Of course, the operating RPM of the compressor may be changed later according to additional conditions. Once the temperature inside the storage compartment has fallen down to reach the set temperature, the operation of the compressor may stop so as not to supply additional cold air, which may prevent unnecessary power consumption.

Figure 4:
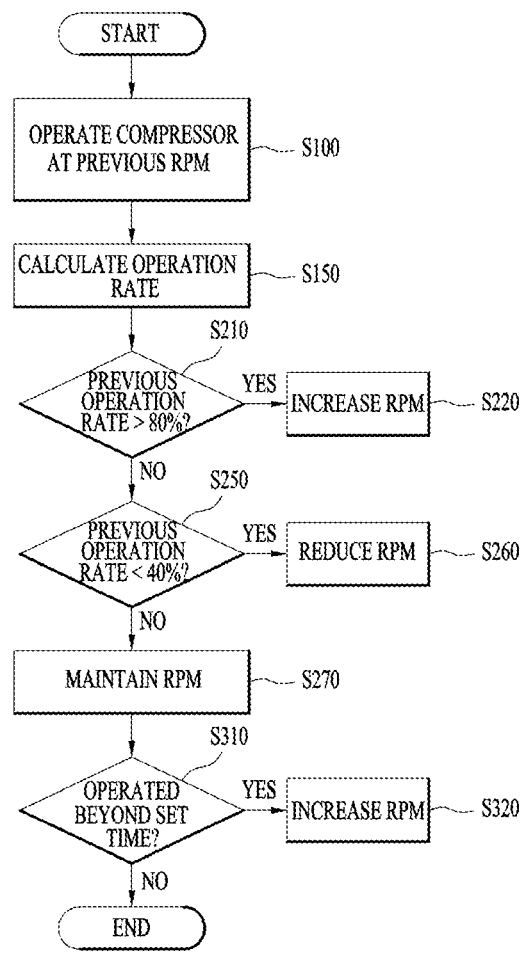
FIG. 4 is a detailed explanatory view of FIG. 3.
Figure 5:
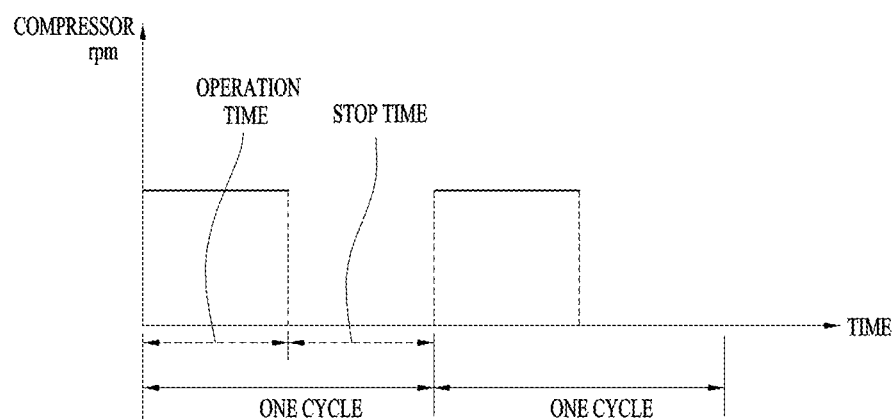
FIG. 5 is an explanatory view of the rate of operation.
Figure 6A:
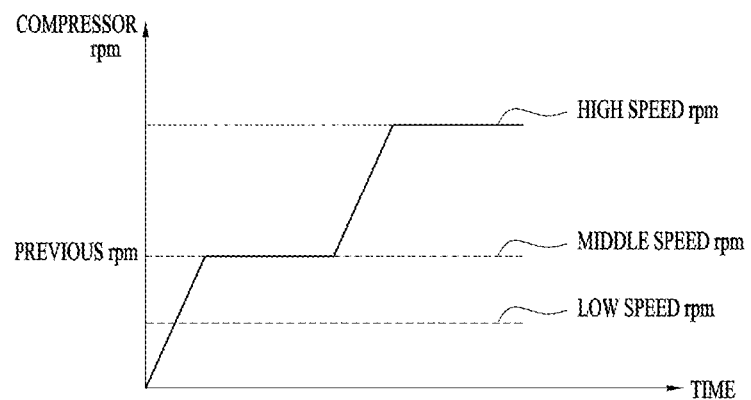
FIG. 6A is a view illustrating an implementation example according to one embodiment of the present disclosure.
Figure 6B:
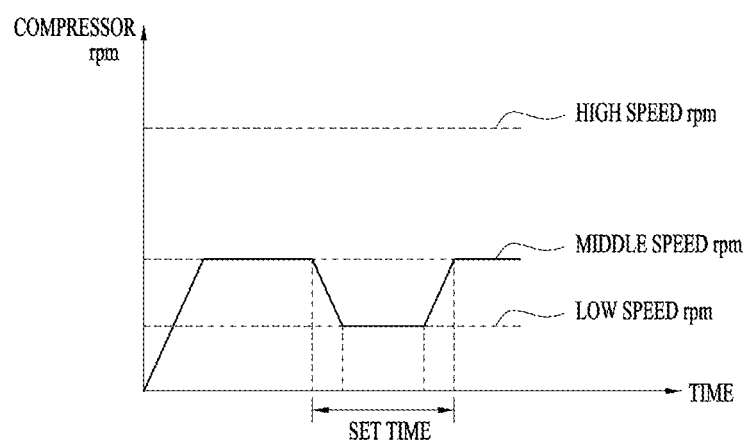
FIG. 6B is a view illustrating another implementation example according to one embodiment of the present disclosure.

FIG. 4 is a detailed explanatory view of FIG. 3, FIG. 5 is an explanatory view of the rate of operation, FIG. 6A is a view illustrating an implementation example according to one embodiment of the present disclosure, and FIG. 6B is a view illustrating another implementation example according to one embodiment of the present disclosure.

When the temperature of the storage compartment measured by the temperature sensor 130 increases to a set temperature or more, the drive unit 110 is driven at the same RPM as a previous rotation RPM of the drive unit 110 (S100). The compressor may be operated at the same RPM as that of a previous cycle. An RPM value stored in the storage unit 140 may be used as the previous RPM.

As exemplarily illustrated in FIG. 6A, since the compressor, which has not been operated, starts to be operated at the previous RPM, the RPM of the compressor increases during a prescribed time and, after the prescribed time has passed, the compressor may reach and be operated at the previous RPM. When the compressor starts to be operated, i.e. when the drive unit 110 starts to be rotated, the operation rate of the compressor is calculated (S150).

The compressor is operated in such a manner that the temperature inside the storage compartment comes within a set temperature range as time passes. In this case, the operation of the compressor will stop when the temperature inside the storage compartment is within the set temperature range and the compressor will be operated when the temperature inside the storage compartment deviates from the set temperature range.

As exemplarily illustrated in FIG. 5, as the compressor repeatedly operates or stops as time passes, the temperature inside the storage compartment may fall down below the set temperature range, i.e. below the set temperature. This period is called one cycle. One cycle includes an operation time during which the compressor is operated and a stop time during which the compressor is not operated. Cold air is supplied during the operation time of the compressor and, thus, the temperature inside the storage compartment may fall down.

The operation rate may be calculated by dividing the operation time of the compressor during one cycle by the total time of one cycle. For example, the total time of one cycle may mean a time from a point in time when the compressor starts to be operated to a point in time when the compressor resumes operation after a prescribed stop time of the compressor has passed. The operation rate may mean a ratio of the operation time of the compressor, i.e. a time during which the drive unit 110 is rotated to supply cold air via compression of the refrigerant to the total time of one cycle. The operation rate may be calculated by dividing the sum of the operation time of the compressor during a plurality of cycles by the total duration of the cycles. In the case of FIG. 5, the operation rate may be calculated using a ratio of the sum of the operation time of the compressor during two cycles to the total duration of the two cycles.

In the case where the operation rate is calculated using a plurality of cycles as described above, it is possible to prevent the compressor from being operated to reflect any unusual circumstances during an immediately previous cycle, compared to the case where operation rate is calculated using one cycle. Calculation of the operation rate is possible after a time, during which the compressor's operation starts, proceeds, stops, and is resumed, has passed. This is because the total time of one cycle can be measured only after the corresponding time has passed.

Accordingly, calculation of the operation rate is possible at a point in time when Step S150 and Step S100 are simultaneously implemented, e.g., when the compressor starts to be operated at a previous RPM. In addition, Step S100 is followed by Step S150. The operation rate may be calculated after the point in time when the compressor starts to be operated at a previous RPM has passed.

Due to the fact that Step S150 is implemented either simultaneously with or after Step S100, the operating RPM of the previous cycle may be selected as the initial RPM for operation of the compressor. This allows the RPM for operation of the compressor to be selected relatively easily. Therefore, the present disclosure advantageously enables simplified adjustment of the temperature inside the refrigerator owing to a relatively simplified algorithm for implementation of the present disclosure.

In addition, the RPM of the compressor may be adjusted as in Step S200 of FIG. 3. The RPM of the drive unit 110 may be adjusted based on the operation rate implemented in the previous cycle using Step S150.

The RPM may be increased when the previous operation rate is greater than a first set value, for example, 80% (S210 and S220). As exemplarily illustrated in FIG. 6A, the RPM may be increased to a high speed RPM assuming that the compressor is operated at a middle speed RPM in an initial driving step thereof.

When the previous operation rate is greater than the first set value, it may be determined that the compressor is operated during a longer time than the design condition. Therefore, the RPM may be adjusted to cause the compressor to be operated during a shorter time. In this way, the compressor's RPM is increased, whereas the compressor's operation time is reduced, which realizes an improvement in power efficiency.

Meanwhile, the RPM may be reduced when the previous operation rate is less than a second set value, for example, 40% (S250 and S260). Although not illustrated in FIG. 6A, the RPM may be reduced to a low speed RPM assuming that the compressor is operated at a middle speed RPM in an initial driving step thereof. When the previous operation rate is less than the second set value, it may be determined that the compressor is operated during a shorter time than the design condition. Therefore, the RPM may be adjusted to cause the compressor to be operated during a longer time. In this way, the compressor's RPM is reduced, whereas the compressor's operation time is increased, which realizes an improvement in power efficiency.

Meanwhile, the previous RPM may be maintained when the previous operation rate is within a range between the first set value and the second set value, e.g., a range from 40% to 80% (S270). Although not illustrated in FIG. 6A, the compressor may continue to be operated at a middle speed RPM assuming that the compressor is operated at a middle speed RPM in an initial driving step thereof.

This is because efficient power consumption is interpreted based on a judgment that the compressor is operated at an appropriate load during an appropriate time because the previous operation rate is within a range of the design condition. Although the first set value and the second set value may vary in various ways according to, for example, the kind of the refrigerator or the kind of the compressor, the first set value may be greater than the second set value.

The compressor is operated at the RPM that was adjusted according to the conditions via operations S210 to S270, other than the initial RPM, e.g., the previous RPM. The initial RPM or the previous RPM is merely the RPM at which the compressor was initially operated and the adjusted RPM is used in order to supply cold air in practice for cooling of the storage compartment.

Even if the compressor is operated at the adjusted RPM, the RPM of the compressor is increased after the compressor is operated beyond a set time (S310 and S320). When the compressor is operated during a longer time than the design condition, the RPM of the compressor may be increased to reduce the operation time and thus improve power efficiency.

With reference to FIG. 6B, first, the compressor may be operated at a previous RPM such as, for example, a middle speed RPM. Assuming that the compressor is previously operated at a low speed RPM, the previous RPM may not be the middle-speed RPM, but rather may be the low speed RPM. When the operation rate is less than the second set value, the compressor is operated at the low speed RPM that is less than the middle speed RPM. The drive unit 110 of the compressor is driven at an adjusted RPM that is varied from the previous RPM, thereby enabling the supply of cold air.

However, when the compressor is operated beyond a set time, the compressor may be operated at the middle speed RPM, which is higher than the low speed RPM that is the adjusted RPM. This is because it was judged that the supply of cold air is not reducing the temperature at a sufficient rate, attributable to the adjusted RPM of the compressor in a current cycle.

Meanwhile, the previous RPM as described above may mean a final RPM at which the compressor is operated to supply cold air. The operating RPM of the compressor may vary during a single cycle. The compressor may initially start to be operated at an initial RPM and the RPM of the compressor may be adjusted based on the operation rate. In addition, even if the compressor is operated at the adjusted RPM, the RPM of the compressor may be additionally adjusted when the compressor is operated beyond a set time.

Among these various RPMs during a single cycle, the previous RPM, described in relation with, for example, Step S100, may mean the adjusted RPM of the compressor. When there is an additionally adjusted RPM, the previous RPM may mean the additionally adjusted RPM. That is, the operating RPM of the compressor for the previous cycle may be an RPM that is set to finally operate the compressor before the operation of the compressor stops.

The present disclosure has the effect of reducing manufacturing costs of a refrigerator because the temperature inside the refrigerator is controllable through the use of a compressor microcomputer without having a main microcomputer.

The present disclosure has the effect of improving energy efficiency owing to the more efficient operation of a compressor.

The present disclosure has the effect of simplifying an algorithm for the initial operation of a compressor because the compressor is set to be operated at the same RPM as that of a previous compressor operation cycle upon the initial operation thereof before the operation rate has been calculated.

The present disclosure provides a refrigerator which enables the temperature inside the refrigerator to be adjusted via control of a compressor without having a main PCB, e.g., a main microcomputer for control of the entire refrigerator, and a control method thereof.

The present disclosure provides a refrigerator which enables efficient operation of a compressor, and a control method thereof.

The present disclosure provides a refrigerator which may provide a simplified algorithm for operation of a compressor, and a control method thereof.

In accordance with an aspect of the present disclosure, a control method of a refrigerator includes initially operating a compressor at the same RPM as an operating RPM of the compressor during a previous cycle, adjusting the RPM in consideration of an operation rate of the previous cycle such that the RPM is increased when the operation rate is greater than a first set value, reduced when the operation rate is less than a second set value, and maintained when the operation rate is within a range between the first set value and the second set value, and operating the compressor at the adjusted RPM, wherein the first set value is greater than the second set value.

The operating the compressor at the adjusted RPM may include operating the compressor until a storage compartment reaches a set temperature and stopping operation of the compressor once the storage compartment has reached the set temperature.

The control method may further include calculating an operation rate of an implemented cycle. The calculating may be performed simultaneously with or after the initially operating the compressor. The operation rate may be calculated by dividing an operation time of the compressor within one cycle by a total time of the cycle. The operation rate may be calculated by dividing a sum of compressor's operation time during a plurality of cycles by a total time of the cycles.

The compressor may be operated when the temperature of the storage compartment measured by a temperature sensor deviates from a set temperature range. The operating the compressor at the adjusted RPM may further include additionally adjusting the RPM such that the RPM is increased when a set time has passed. The operating RPM of the compressor for the previous cycle may be an RPM set to finally operate the compressor before operation of the compressor stops.

The compressor may be operated at a low speed RPM having a relatively low speed value, at a high speed RPM having a relatively high speed value, and at a middle speed RPM having an intermediate value between the low speed RPM and the high speed RPM.

One cycle may mean a time from a point in time when the compressor starts to be operated to a point in time when the compressor resumes operation after an operation stop time has passed.

In accordance with another aspect of the present disclosure, a refrigerator includes a drive unit configured to compress refrigerant, a compressor controller configured to operate the drive unit at a set RPM so as to generate cooling force, a temperature sensor configured to measure a temperature inside a storage compartment, and a storage unit configured to store an operating RPM of a compressor during a previous cycle, wherein the compressor controller initially operates the drive unit at the same RPM as the operating RPM of the compressor during the previous cycle, and wherein the compressor controller adjusts the RPM in consideration of an operation rate of the previous cycle such that the RPM is increased when the operation rate is greater than a first set value, reduced when the operation rate is less than a second set value, and maintained when the operation rate is within a range between the first set value and the second set value, and wherein the first set value is greater than the second set value. The refrigerator may further include a timer configured to measure the lapse of time, wherein the compressor controller calculates an operation rate of an implemented cycle.

The compressor controller may calculate the operation rate at or after a point in time when the drive unit is operated. The operation rate may be calculated by dividing an operation time of the drive unit during one cycle by a total time of the cycle. The operation rate may be calculated by dividing a sum of the operation time of the drive unit during a plurality of cycles by a total time of the cycles.

One cycle may mean a time from a point in time when the drive unit starts to be operated to a point in time when the drive unit resumes operation after an operation stop time has passed.

The compressor controller may operate the drive unit until the storage compartment reaches a set temperature and may stop operation of the drive unit once the storage compartment has reached the set temperature.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a cabinet having a storage compartment to store food therein;
a door to open or close the storage compartment;
an evaporator positioned in the storage compartment;
a drive unit to compress refrigerant supplied to the evaporator;
a thermostat to measure a temperature inside the storage compartment so as to open or close a circuit that supplies current to the drive unit;
a timer to measure a time during which the drive unit is operated, and a time from a point in time at which the drive unit starts to be operated to a point in time at which the drive unit resumes operation; and
a compressor controller to adjust an RPM of the drive unit via the timer and the thermostat,
wherein the compressor controller calculates an operation rate by dividing the time during which the drive unit is operated by the time from the point in time at which the drive unit starts to be operated to the point in time at which the drive unit resumes operation, and wherein the compressor controller adjusts the RPM of the drive unit by comparing the calculated operation rate with a set value, and wherein the compressor controller adjusts the RPM of the drive unit by comparing an average value of operation rates of performed cycles with the set value.

2. The refrigerator according to claim 1, wherein the thermostat maintains the circuit closed so that current is supplied to the drive unit when the temperature inside the storage compartment has not yet reached a set temperature.

3. The refrigerator according to claim 1, wherein the thermostat opens the circuit so that the current is no longer supplied to the drive unit when the temperature inside the storage compartment has reached a set temperature.

4. The refrigerator according to claim 1, wherein the timer measures the time during which the drive unit is operated and the time from the point in time at which the drive unit starts to be operated to the point in time at which the drive unit resumes operation a plurality of times.

5. The refrigerator according to claim 1, wherein the timer successively measures the time, during which the drive unit is operated, and the time from the point in time at which the drive unit starts to be operated to the point in time at which the drive unit resumes operation while a plurality of cycles is performed.

6. The refrigerator according to claim 1, wherein the set value includes a first set value, and wherein the compressor controller increases the RPM of the drive unit when the operation rate is greater than the first set value.

7. The refrigerator according to claim 6, wherein the first set value is 80%.

8. The refrigerator according to claim 1, wherein the set value includes a second set value, and wherein the compressor controller reduces the RPM of the drive unit when the operation rate is less than the second set value.

9. The refrigerator according to claim 8, wherein the second set value is 40%.

10. The refrigerator according to claim 1, wherein the set value includes a first set value and a second set value, and wherein the compressor controller maintains the RPM of the drive unit when the operation rate is within a range between the first set value and the second set value.

11. The refrigerator according to claim 10, wherein the first set value is 80%, and the second set value is 40%.

12. The refrigerator according to claim 1, wherein a speed of the drive unit is variable between a low speed RPM, a middle speed RPM, and a high speed RPM.

13. The refrigerator according to claim 1, wherein the timer measures a time lapsed from the point in time at which the drive unit starts to be operated, and wherein the compressor controller increases the RPM of the drive unit when the lapsed time exceeds a set time.

14. The refrigerator according to claim 13, wherein a speed of the drive unit is variable between a low speed RPM, a middle speed RPM, and a high speed RPM, and wherein the compressor controller increases the RPM of the drive unit from the low speed RPM to the middle speed RPM or from the middle speed RPM to the high speed RPM when the lapsed time exceeds the set time.

15. The refrigerator according to claim 1, wherein the compressor controller operates the drive unit at an RPM of the drive unit during a previous cycle.

16. The refrigerator according to claim 1, wherein the compressor controller operates the drive unit at a middle speed RPM.

* * * * *